US00RE38951E

(19) United States
(12) Reissued Patent
Vito

(10) Patent Number: US RE38,951 E
(45) Date of Reissued Patent: Jan. 31, 2006

(54) ANTI-THEFT BRAKE OR CLUTCH LOCKING DEVICE

(75) Inventor: Robert A. Vito, Berwyn, PA (US)

(73) Assignee: Unbreakable Company, Berwyn, PA (US)

(21) Appl. No.: 09/808,882

(22) Filed: Mar. 15, 2001

Related U.S. Patent Documents

Reissue of:
(64) Patent No.: 5,881,587
Issued: Mar. 16, 1999
Appl. No.: 09/004,666
Filed: Jan. 8, 1998

U.S. Applications:
(63) Continuation-in-part of application No. 08/949,009, filed on Oct. 10, 1997, now Pat. No. 5,870,912.

(51) Int. Cl.
*F16H 57/00* (2006.01)

(52) U.S. Cl. ..... 70/202; 70/237; 70/201
(58) Field of Classification Search ..... 70/198–204, 70/209, 237, 238
See application file for complete search history.

(56) References Cited

U.S. PATENT DOCUMENTS

| | | | | | |
|---|---|---|---|---|---|
| 2,330,536 | A | * | 9/1943 | Zimmerman | 70/199 |
| 3,245,239 | A | | 4/1966 | Zaidener | |
| 3,889,499 | A | | 6/1975 | Cramer | |
| 4,040,675 | A | * | 8/1977 | Richmond | 303/89 |
| 4,493,198 | A | * | 1/1985 | Brown | 70/203 |
| 4,779,435 | A | * | 10/1988 | Farrow | 70/202 X |
| 4,934,492 | A | * | 6/1990 | Hayes-Sheen | 188/353 |
| 5,040,387 | A | * | 8/1991 | Knott, Jr. | 70/202 |
| 5,267,458 | A | * | 12/1993 | Heh | 70/238 |
| 5,282,373 | A | * | 2/1994 | Riccitelli | 70/199 |
| 5,345,796 | A | * | 9/1994 | Chieh et al. | 70/202 |
| 5,354,031 | A | | 10/1994 | Bilotti | |
| 5,537,846 | A | * | 7/1996 | Simon | 70/202 |
| 5,653,133 | A | * | 8/1997 | Passantino | 70/202 |
| 5,678,433 | A | * | 10/1997 | Riccitelli | 70/209 |
| 5,704,233 | A | * | 1/1998 | Farshad | 70/238 |
| 5,715,710 | A | * | 2/1998 | DeLucia et al. | 70/202 |
| 5,778,706 | A | | 7/1998 | Testa | |
| 5,870,912 | A | | 2/1999 | Vito | |
| 5,881,587 | A | | 3/1999 | Vito | |
| 5,906,121 | A | | 5/1999 | Mankarious | |
| 5,911,765 | A | | 6/1999 | DaSilva | |
| 5,950,463 | A | | 9/1999 | Glazier et al. | |
| 5,979,197 | A | | 11/1999 | Mellini et al. | |
| 6,089,055 | A | | 7/2000 | Vito | |
| 6,192,724 | B1 | | 2/2001 | Vito | |
| 6,202,456 | B1 | | 3/2001 | Vickers | |

FOREIGN PATENT DOCUMENTS

| | | | | |
|---|---|---|---|---|
| DE | 92 15 118.3 U1 | | 2/1993 | |
| DE | 297 19 904 U1 | | 2/1998 | |
| EP | 0 404 709 A1 | | 12/1990 | |
| FR | 862868 | * | 3/1941 | 70/202 |

(Continued)

*Primary Examiner*—Suzanne Dino Barrett
(74) *Attorney, Agent, or Firm*—Volpe and Koenig, P.C.

(57) ABSTRACT

A device for locking [the] *a* brake *pedal and brake pedal shaft* of a vehicle [and preventing its theft comprising:], *which includes* a base member for a placement on [the] *a* floorboard of [a] *the* vehicle beneath [a] *the* brake pedal[; a] *and break pedal shaft. A* U-shaped housing [extending] *extends* downward and [having] *has* a first arm attached to the base and [having] a second shorter arm defining [a gap] *an opening* for receipt of [a] *the* brake pedal shaft[, said space]. *The opening* between the first and second arms [defining] *defines* a slot for receiving the brake pedal shaft and [permitting its] *permits* full extension *of the brake pedal shaft* upward through said [shaft; and] *slot. A* locking [means] *mechanism is* associated with the [second] *first* arm for locking [the] *an* underside of the pedal *shaft* within the slot such that the brake pedal cannot be depressed.

34 Claims, 4 Drawing Sheets

FOREIGN PATENT DOCUMENTS

| | | | | |
|---|---|---|---|---|
| FR | 2 419 846 | | 10/1979 | |
| FR | 2 422 529 | | 11/1979 | |
| FR | 2443946 | | 8/1980 | |
| FR | 2 579 943 | A1 | 10/1986 | |
| FR | 2 580 243 | A | 10/1986 | |
| FR | 2 681 823 | A1 | 4/1993 | |
| FR | 2 719 005 | A1 | 10/1995 | |
| FR | 2 744 409 | | 8/1997 | |
| GB | 160160 | | 12/1921 | |
| GB | 1033994 | | 6/1966 | |
| GB | 2 023 520 | A | 1/1980 | |
| GB | 2091656 | A | 8/1982 | |
| GB | 2 246 105 | A | 1/1992 | |
| GB | 2255060 | * | 10/1992 | ..... 70/199 |
| WO | WO 97/15476 | | 5/1997 | |
| WO | WO 99/19643 | | 4/1999 | |

* cited by examiner

ANTI-THEFT BRAKE OR CLUTCH LOCKING DEVICE

Matter enclosed in heavy brackets [ ] appears in the original patent but forms no part of this reissue specification; matter printed in italics indicates the additions made by reissue.

CLAIM OF PRIORITY

This application is a continuation-in-part of co-pending U.S. Ser. No. 08/949,009 entitled ANTI-THEFT BRAKE LOCKING DEVICE filed Oct. 10, 1997.

FIELD OF THE INVENTION

This invention relates to an anti-theft brake-locking device for vehicles, which is particularly suitable for both automatic and standard transmission vehicles. More particularly, this invention relates to a device which prevents the brake or clutch pedal from being depressed.

BACKGROUND OF THE INVENTION

Automotive theft is a major worldwide problem. The U.S. Federal Bureau of Investigation has reported that a car is stolen every 20 seconds.

The proliferation of mechanical type anti-theft devices for motor vehicles have resulted in the commercial availability of different types of anti-theft devices. One type of prior art system mechanically locks the brake and accelerator by means of two independent or articulated shoes which lock the pedals. The major problem stemming from the use of such devices is that the driver has to reach out for the pedal area or actually get down on his or her knees in order to operate the locking device, and the varying distance between the brake and accelerator which can prevent the device from being installed.

More recently, some devices have been suggested which are constructed from a long rod consisting of an anti-picking material and which is provided at both ends with two shaped members that couple respectively with a pedal and with the steering wheel of the vehicle. The coupling with the steering wheel is locked using a safety lock that prevents the same from being disengaged. This device, which owing to its characteristics, can be employed on traditional transmission cars as well as on automatic transmission vehicles, is affected in the main by two drawbacks.

First, the connection, due it longitudinal size and cumbersomeness is difficult to store when the device is not being utilized. Secondly, devices of this nature actually have a poor record against theft. Indeed, it is relatively easy to cut the rim of the steering wheel by means of a saw or the like. The rim of the steering wheel is usually not a viable obstacle for thieves, and the anti-theft device by can be disengaged merely pulling apart the two ends of the rim. Such devices are also not usually adaptable for automatic transmission vehicles because of their structural characteristics.

In UK patent application No. 2.091.656, an anti-theft pedal-locking device for vehicles is described comprising a first supporting member extending upwards and provided with a safety lock and with a laterally projecting member, a second supporting member, upon which the first supporting member slides, with a projecting member cooperating with the corresponding member of the first supporting member so as to lock a pedal of the vehicle when the latter member is in its lower position, while the lower end of the second supporting member may carry a base member to rest on the floor of the vehicle.

A number of United States Patents have also issued on brake locking mechanisms. U.S. Pat. No. 4,040,675 discloses a vehicle anti-theft device which maintains the braking function of the braking fluid by preventing reverse flow thereof from the wheel cylinder back to the master cylinder until an authorized procedure permits said backflow.

U.S. Pat. No. 4,493,198 discloses an anti-theft lock for a pedal operated apparatus. The invention incorporates first and second stop bodies which are arranged to clamp around the lever of a pedal. When the stop bodies are locked in place, the pedal cannot be operated unless the apparatus is restrained.

U.S. Pat. No. 4,934,492 discloses an automatic brake-locking mechanism which locks the brake of a vehicle having a hydraulic brake system. The system incorporates a safety switch provided to operate in conjunction with the ignition switch so that the safety switch and the ignition both must be operated to an "on" position to release the auxiliary brake device to allow normal operation of the vehicle.

U.S. Pat. No. 5,040,387 similarly discloses a vehicle brake lock assembly which engages a brake pedal and which includes a U-shaped end portion which engages the brake pedal telescopically to lock the brake pedal in position.

U.S. Pat. No. 5,345,796 discloses a vehicle brake-pedal locking device which mechanically maintains the vehicle brake pedal in a depressed position to prevent the vehicle from being driven. The device includes a horizontally and vertically pivoting brake-pedal swing arm interfacing structure.

Finally, U.S. Pat. No. 5,653,133 discloses an anti-theft device for vehicles having a steering wheel and a brake. The device comprises a brake guard moveably mounted to a fixed portion of the brake, a lower elongated member which hooks to the brake guard, an upper elongated member which is locked to the lower elongated member, a wide bar spaced a distance adaptable to be placed around the steering wheel and a locking bar and a claw member. When the device is secured with two padlocks, movement of the steering wheel and the brake pedal is prevented.

In addition to above discussed devices and technologies, the prior art also includes complex tracking devices which send out signals to police if a vehicle is reported stolen. The search may take up to 24 hours or longer with no guarantee of recovery. Installation of these systems is expensive and require a monthly monitoring fee. Automotive alarms are similarly expensive and may be deactivated by car thieves.

While the prior art is replete with mechanisms and inventions for locking the brake pedals of a vehicle, there is no simple and easy system ever devised for swiftly securing the brake or clutch pedal in a non-depressible state without the driver or operator having to get down on his or her knees or crouch down. Such a system would be to disable a vehicle, because automobiles built since 1990 cannot start and be placed into gear without the brake or clutch pedal being depressed.

The present invention is thus directed to a brake or clutch lock mechanism which does not require the driver or vehicle operator to get down on his knees or to move beneath the vehicle and which prevent the brake from being depressed. These and other objects of the present invention will be described with reference to the following summary and detailed description.

SUMMARY OF THE INVENTION

In accordance with the present invention, a device for locking the brake or clutch of a vehicle in an upward or unextended position and preventing vehicle theft is disclosed. The invention comprises a base member for a placement on the floorboard of a vehicle beneath a brake or clutch pedal; a U-shaped housing extending downward and having a first arm attached to the base and having a second shorter arm defining a gap for receipt of a brake or clutch pedal shaft, said space between the first and second arms defining a slot for receiving the brake or clutch pedal shaft and permitting its full extension upward through said shaft; and locking means associated with the second arm for locking the underside of the pedal within the slot such that the brake pedal cannot be depressed.

In a more preferred embodiment, the present invention is directed to a device for locking the brake of a vehicle and preventing its theft comprising: a base member for a placement on the floorboard of a vehicle beneath a brake pedal; a metallic U-shaped housing extending downward and having a first arm attached to the base and having a second shorter arm defining an opening for receiving of a brake pedal shaft, said space between the first and second arms defining a slot for receiving the brake pedal shaft and permitting its full extension upward through said slot, said first arm having a cylindrical opening therethrough; a rod extending through said cylindrical opening and being slidable therewith, said rod having a pin which catches the underside of said brake pedal shaft and pulls it upward in a decompressed position; and locking means for locking the position of the rod and pin such that the that the brake pedal cannot be depressed.

In still a further embodiment, the present invention is directed to a device for locking the brake of a vehicle and preventing its theft comprising: a base member for a placement on the floorboard of a vehicle beneath a brake pedal; a steel U-shaped housing extending downward and having a first arm attached to the base and having a second shorter arm defining an opening for receiving of a brake pedal shaft, said space between the first and second arms defining a slot for receiving the brake pedal shaft and permitting its full extension upward through said slot, said first arm having a cylindrical opening extending therethrough and collinearly with said slot; a serrated rod extending through said cylindrical opening and being slidable therewith, said rod having a pin at a first end for catching the underside of said brake pedal shaft and a handle at a second end for pulls it upward in a decompressed position; and locking means adapted to lock the serrated rod for locking the position of the rod and pin such that the that the brake pedal cannot be depressed.

DETAILED DESCRIPTION OF THE PREFERRED EMBODIMENT

Figure 2:
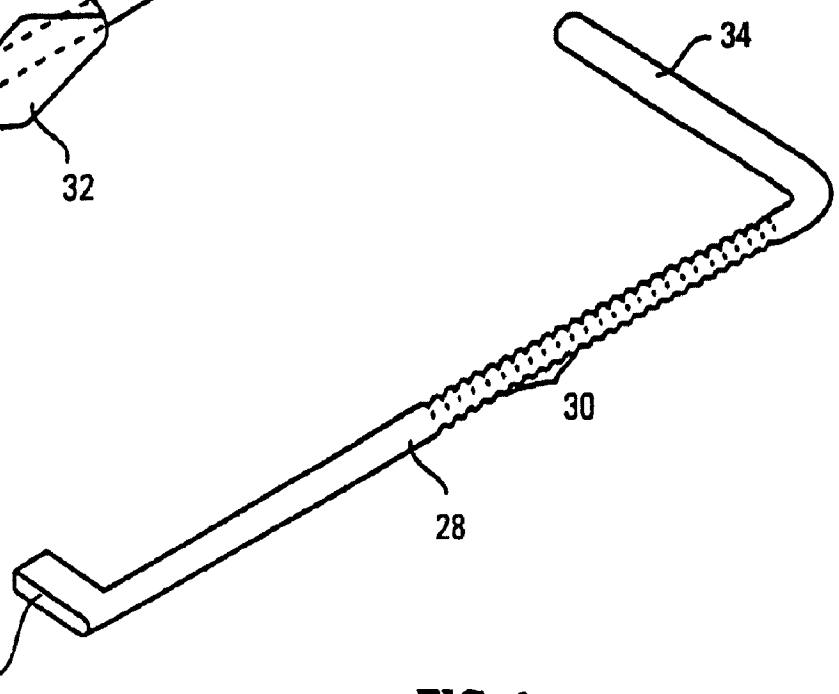
FIG. 2 is [an elevational] *a perspective* view of the handle and lock pin utilized with the brake lock mechanism of the brake anti-theft device of the present invention.
Figure 1:
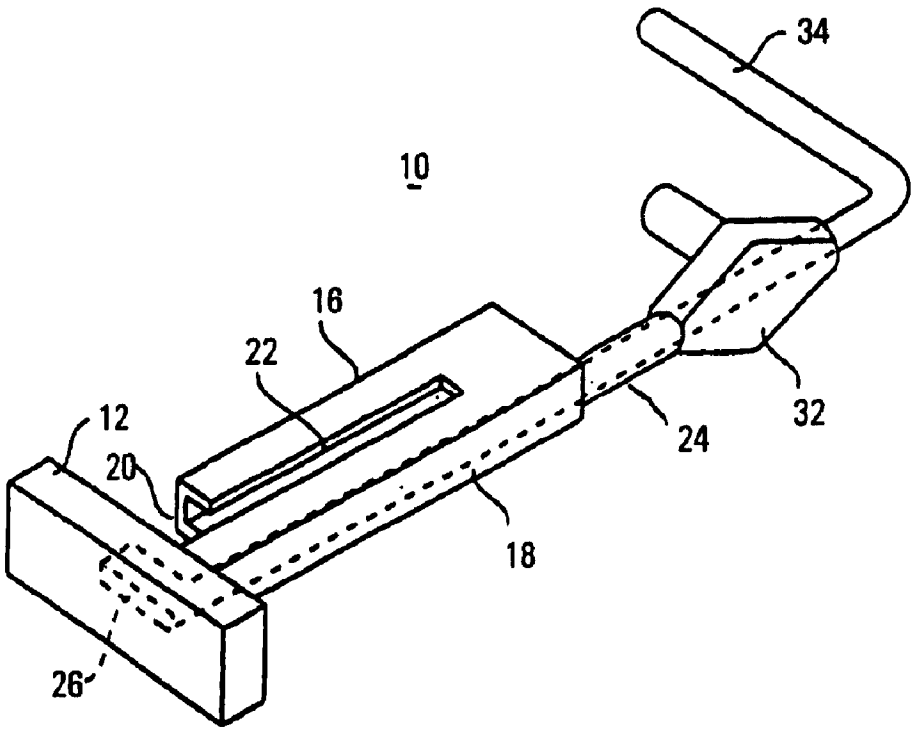
FIG. 1 is [an elevational] *a perspective* view of the brake anti-theft device of the present invention.
Figure 3:
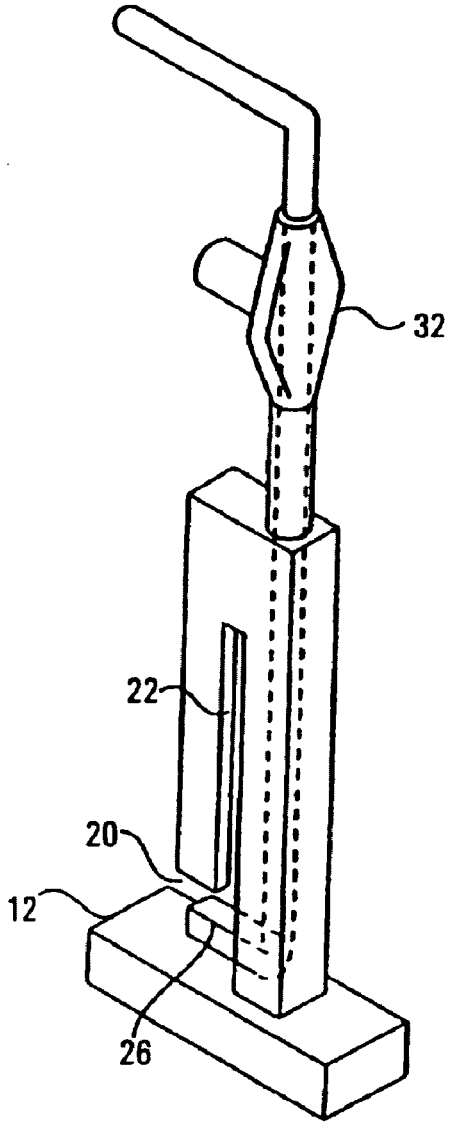
FIG. 3 is [an elevational] *a perspective* view of the brake locking anti-theft device of the present invention in an inactive position.
Figure 4:
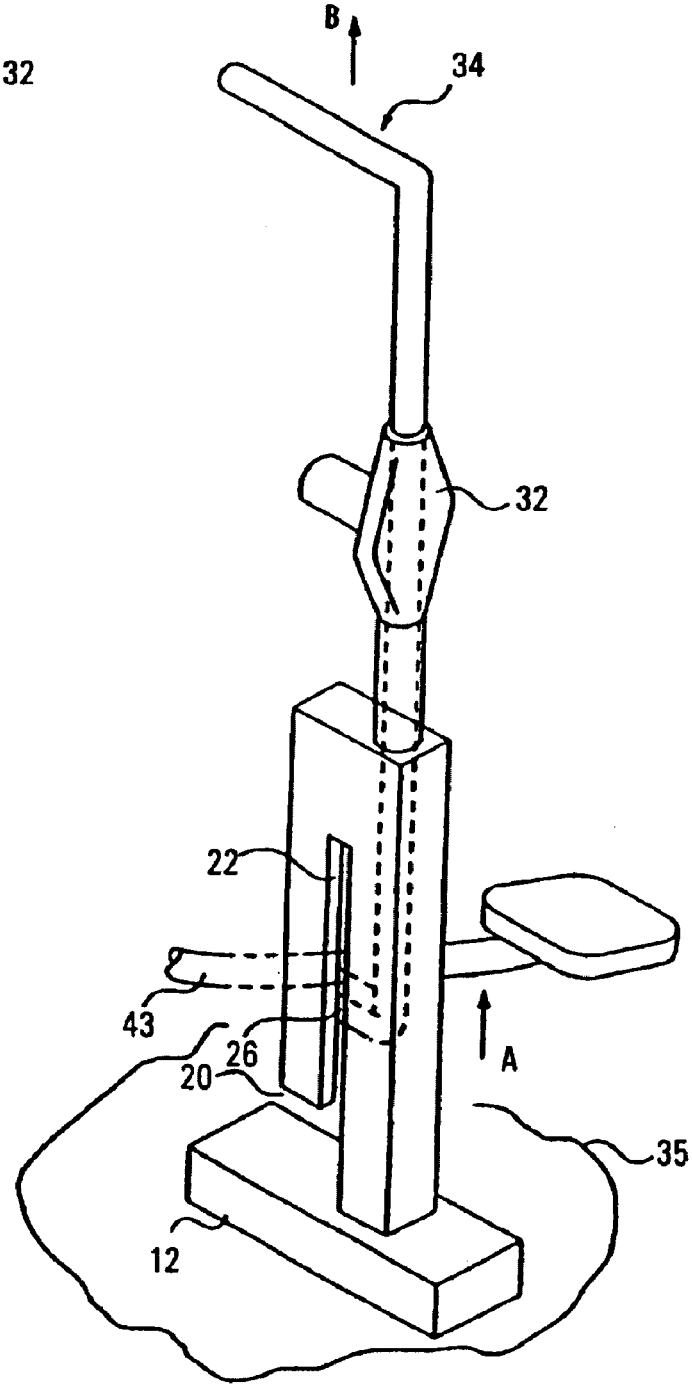
FIG. 4 is [an elevational] *a perspective* view of the brake locking anti-theft device of the present invention in an activated state.

The brake anti-theft device of the present invention is now described with reference to the enclosed Figures wherein the same numbers are utilized where applicable. In general, the present invention is a device specifically designed to lock the brake or clutch pedal of a motor vehicle in an up or non-depressed state.

Because since 1990, vehicles manufactured for sale in North American cannot start without the depression of the brake pedal or clutch pedal, the invention is specifically designed to prevent the pedal from being depressed thus, thereby disabling the vehicle and preventing its theft and use. This feature is referred to as the brake pedal shift interlock or BPSI in automatic transmission vehicles. Non-automatic transmission or so-call "standard have a similar feature called the clutch pedal start interlock or CPSI, which requires the suppression of the clutch pedal to start the vehicle. The present invention is applicable to both types of vehicles.

A particular feature of the present invention is that it is intended to be utilized by the driver or operator from the comfort of the driver's seat of the vehicle without any need for the driver to get down on his hands or knees or crouch in order to place or adjust the system. While the present invention will be described in the context of a conventional automobile, it is to be appreciated that the teachings of the present invention are equally applicable to all manner of vehicles having brake shafts including sports utility vehicles, vans, pick-up trucks and trucks.

For purposes of explanation the present invention is now described in the context of a device which locks a brake pedal *50* in an upward position, thus *preventing the* disabling *of* the BPSI of the vehicle. Referring now to FIGS. 1 to 4, the brake lock anti-theft device of the present invention 10 comprises a base 12 which is placed on the floor of the vehicle adjacent to the brake pedal *50* and shaft 13. The base 12 thereby is affixed flush to the floorboard *35* of the vehicle directly below the brake pedal *50* and pedal shaft 13.

Extending from the base 12 is a U-shaped steel housing 14 which extends downward. The U-shaped housing comprises two arms 16, 18. One arm 16 of the U-shaped housing is shorter than the other 18 thereby defining an opening 20 which extends to a slot 22 defined by the space between the arms legs of the U-shaped housing *14*. The opening 20 facilitates the placement and removal of the brake pedal shaft 13. In a preferred embodiment, slot 22 should have an approximate width of the steel brake pedal shaft 13 such that the brake pedal shaft 13 extends through the slot *22* and up to a extended position. In this position, the pedal *50* can be depressed freely as it extends downward through said slot 22.

The invention further comprises a locking mechanism 32 associated with a second leg 18 of the U-shaped housing *14*. The second leg 18 of the U-shaped housing 14 includes a cylindrical tube 24 designed to encase a slidable locking pin 26 which is attached to the end of an extendible rod 28. The rod 28 contains machined lock ratchets or serrations 30 which extend out the tube of the rectangular steel housing to a locking mechanism 32. The second end of the rod 28 comprises a handle 34 which is used to pull the rod upward.

The preferred locking mechanism or means 32 which is utilized in the present invention may be a commercially available key operated steering wheel locking mechanism[s]. There are other locking mechanisms suggested by the present invention including combination locks.

Locking mechanism or means 32 locks the machine locked ratchets 30 at the appropriate point. As shown most clearly in FIG. 4, as the rod 28 extends upward, the pin 26 enters the slot 22, pulls up (Arrow A) and secures the bottom of the brake [petal] *pedal* shaft 13 in an upward or unextended position so that it cannot be depressed. In this position, after being locked into place by pin 26, the brake pedal shaft *13* cannot be depressed. Because the pedal *50* cannot be depressed, the car cannot be placed in gear.

Figure 5:
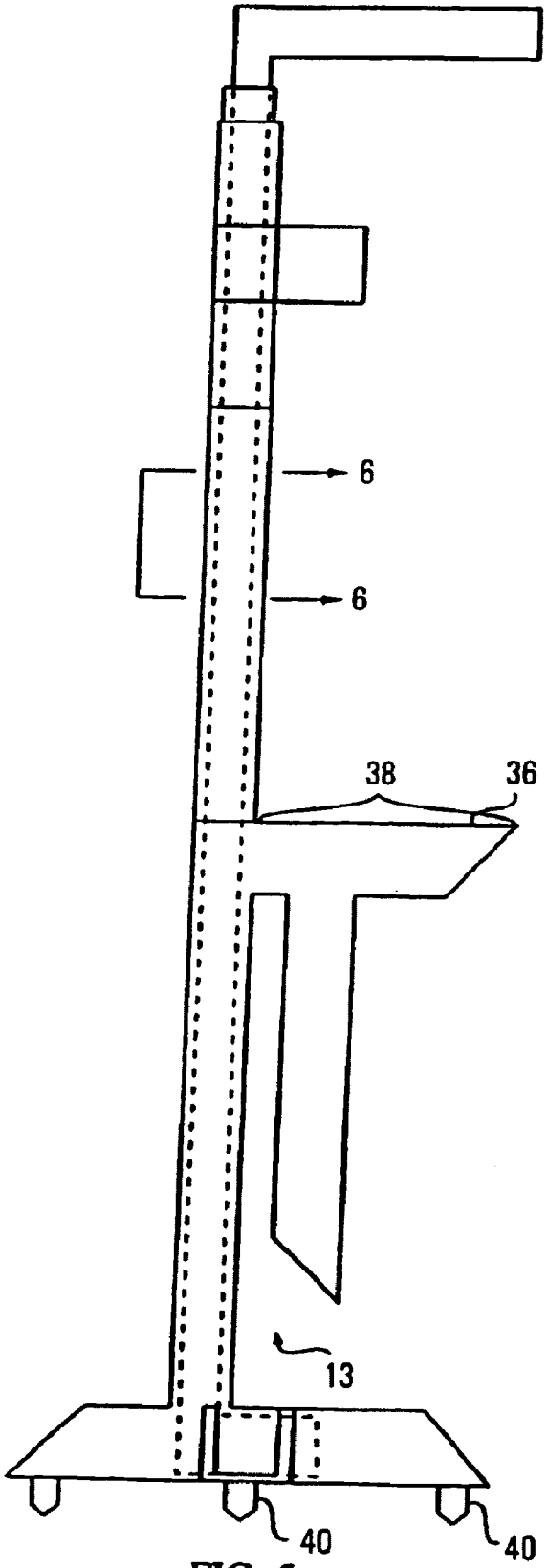
FIG. 5 is a [side perspective] *front elevational* view of an alternative embodiment of the brake locking anti-theft device of the present invention.
Figure 6:
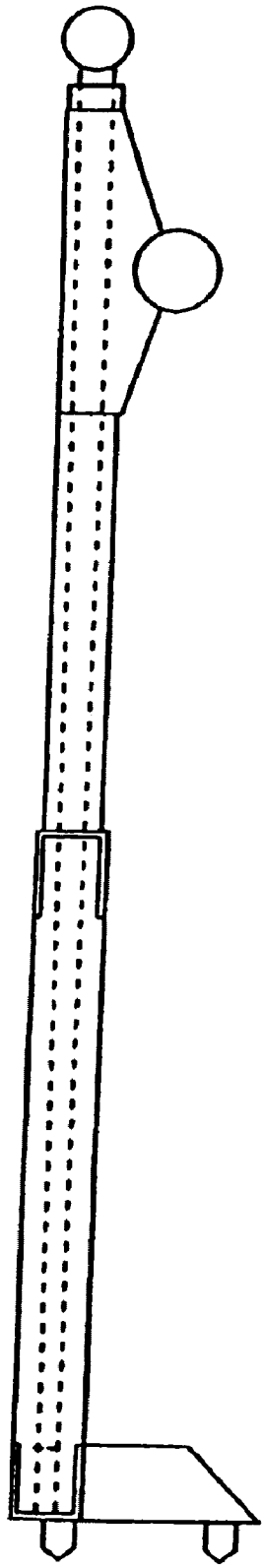
FIG. 6 is a [perspective] *right side elevational* view of the alternative embodiment of the brake locking anti-theft device of the present invention [along line 6—6 of] *shown in* FIG. 5.

An alternative embodiment of the present invention is shown in FIGS. 5 and 6. As shown in FIG. 5, the base 12 and bottom of leg 16 are beveled at 45 degree angles so that the brake pedal shaft 13 can more easily be guided into and out of the slot 22 when the device is [place] *placed* on and removed from the brake pedal shaft 13.

Figure 7:
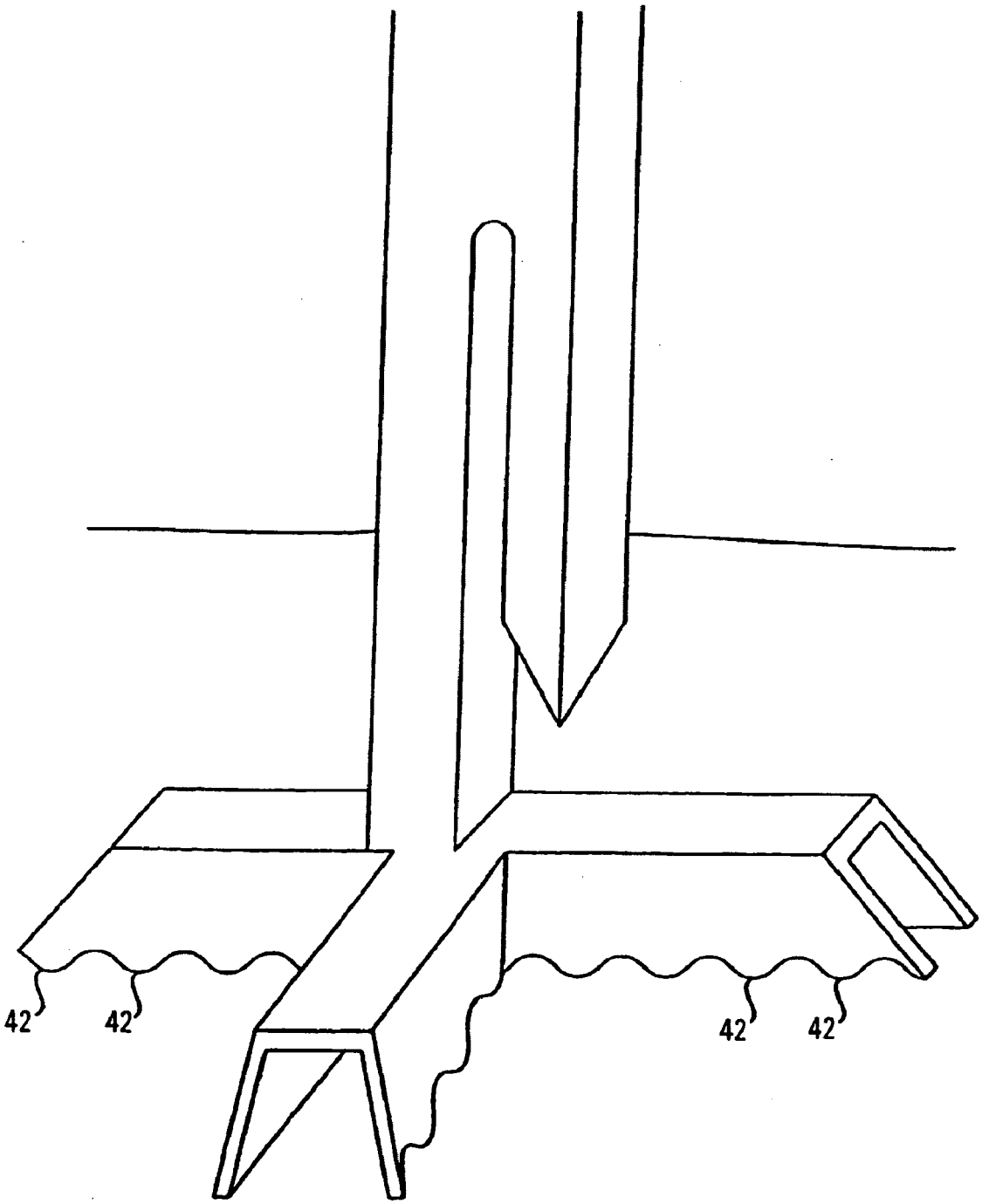
FIG. 7 is a *partial* perspective view of yet an additional base embodiment for use in the present invention.

This embodiment further incorporates a means 36 for enabling the driver to press the device into the floorboard or carpet of the vehicle. In a preferred embodiment, means 36 comprises a foot rest 36 which extends horizontally from the top of leg 16. This extension 36 provides a sufficient surface area 38 for the foot of an operator to press downward. This embodiment further incorporates studs 40 which extend downward from the base 12 and which facilitate the positioning of the device against a carpeted floor. The studs 40 prevent the device from moving with respect to the floor. As shown in FIG. 7, the device may also incorporate cleats 42 which are cut into the bottom of the base 12. Finally, as also shown in FIG. 7, this embodiment incorporates a triangular base design in which the legs go to the left, right and straight back. The triangular base design provides maximum support and strength in operation and use.

The operation of the present invention is now described with reference to the enclosed Figures and most particularly FIGS. 3 through 6. The driver or operator desiring to utilize the device 10 will unlock the device *10* and lower the pin 26 all the way down to the base 12 via the handle *34*. The base 12 will then be placed on the floor board 35 under the brake *pedal 50* and *brake pedal* shaft 13. The brake pedal shaft *13* will then extend through the opening 20 in the U-shaped housing *14* and into the slot 22 with the base *12* positioned squarely on the floor board *35* of the vehicle. The operator will then pull up the handle 34 (Arrow B) thus raising the locking pin 26 upward into the slot 22 and securing the [base] *brake* pedal *shaft* 13 at its bottom in an upward position. As shown in the alternative embodiment of FIGS. 5 and 6, the operator can place his foot on extension 36 to maximize the downward thrust of the device against the floor board *35* of the vehicle. Studs 40 secure the device against the floorboard *35* or carpet. The vehicle operator will then lock the device in this position using the lock mechanism *32* such that the brake pedal *50* cannot be depressed, thereby disabling the operation of the vehicle.

The present invention has been described in the context of locking the brake of a vehicle. In standard transmission vehicles, the device will be affixed to the clutch of the vehicle in the discussed above. Because the clutch is then locked in an upward position and cannot be depressed, the vehicle cannot be started. Accordingly, the teachings of the present invention are equally applicable to affixation to a clutch in a standard transmission vehicle.

The present invention has been described with reference to a preferred embodiment. It is to be appreciated that other embodiments fulfill the spirit and scope of the present invention and that the true nature and scope of the present invention is to be determined with reference to the claims appended hereto.

I claim:

1. A device for locking [the] *a brake or clutch* pedal *and a brake or clutch pedal shaft* of a vehicle and preventing the theft of said vehicle, said [vehicle] *device* comprising:

a base member for a placement on [the] *a* floorboard of the vehicle beneath [a] *the brake or clutch* pedal and *the brake or clutch* pedal shaft;

a U-shaped housing extending downward and having a first arm attached to [the] *said* base and having a second shorter arm defining a gap for [receipt of] *receiving* the *brake or clutch* pedal shaft, said [space] *gap* between [the] *said* first and second arms defining a slot for receiving the *brake or clutch* pedal shaft and permitting [its] full extension *of the brake or clutch pedal shaft* upward through said slot; and a locking mechanism associated with [the] *said* first arm for locking [the] *an* underside of the *brake or clutch* pedal shaft within [the] *said* slot such that the *brake or clutch* pedal shaft cannot be depressed.

2. The device of claim 1 wherein said locking mechanism is activated by a key.

3. The device of claim 1 wherein [said locking mechanism is activated by a combination] *said brake or clutch pedal is a brake pedal*.

4. The device of claim 1 wherein said *brake or clutch* pedal is a [brake] *clutch* pedal.

[5. The device of claim 1 wherein said pedal is a clutch pedal.]

6. A device for locking [the] *a* brake or clutch *pedal and a brake or clutch pedal shaft* of a vehicle, [and preventing the theft of] said [vehicle] *device* comprising:

a base member for a placement on [the] *a* floorboard of [a] *the* vehicle beneath [a] *the* brake or clutch pedal and [a] *the* brake or clutch *pedal* shaft;

a metallic U-shaped housing extending downward and having a first arm attached to [the] *said* base and having a second shorter arm defining an opening for receiving [of] the brake or clutch pedal shaft, said [space] *opening* between [the] *said* first and second arms defining a slot for receiving the brake or clutch pedal shaft and permitting [the] full extension of the brake or clutch pedal shaft both upward and downward through said slot, said first arm having a cylindrical opening therethrough;

a rod extending through said cylindrical opening and being slidable [therewith] *therein*, said rod having a pin which catches [the] *an* underside of [said] *the* brake or clutch pedal shaft within [the] *said* slot and pulls [it] *the brake or clutch pedal shaft* upward in a decompressed position; and a locking mechanism for locking [the position of the] *said* rod and pin *with respect to said housing* such that the brake or clutch pedal cannot be depressed.

7. The device of claim 6 wherein said locking mechanism is activated by a key.

8. The device of claim 7 wherein said locking mechanism is activated by a combination.

9. A device for locking [the] *a* brake *or clutch pedal* and *a* brake *or clutch* pedal *shaft* of a vehicle [and preventing the theft of], said [vehicle] *device* comprising:

a base member having studs for a placement on [the] *a* floorboard of [a] *the* vehicle beneath [a] *the* brake [pedal] *or clutch pedal and brake or clutch pedal shaft*;

a [stainless steel] U-shaped housing extending downward and having a first arm attached to [the] *said* base and having a second shorter arm defining an opening for receiving [of a] *the* brake *or clutch* pedal shaft, said [space] *opening* between [the] *said* first and second arms defining a slot for receiving the brake *or clutch* pedal shaft and permitting [its] full extension *of the* [control] *brake or clutch pedal shaft* both upward and downward through said slot, said first arm having a cylindrical opening extending therethrough [and collinearly with said slot];

a serrated rod extending through said cylindrical opening and being slidable [therewith] *therein*, said rod having a pin at a first end for catching [the] *an* underside of [said] *the* brake *or clutch* pedal shaft within [the] *said* slot and a handle at a second end for pulling the *brake or clutch* pedal shaft upward in a decompressed position; and a locking mechanism adapted to lock [the] *said* serrated rod and pin [in position] *with respect to said housing* such that the brake *or clutch* pedal cannot be depressed.

10. The device of claim 9 further comprising extension means for facilitating the compression of [the] *said* device by the foot of an [operators] *operator* against the floorboard of [a] *the* vehicle.

11. The device of claim 9 further comprising studs for securing [the] *said* base against the floorboard of [a] *the* vehicle.

12. The device of claim 9 wherein said base is triangular in shape.

13. A device for locking [the] *a* brake *or clutch pedal and brake or clutch pedal shaft* of a vehicle [and preventing the theft of], said [vehicle] *device* comprising:

a base member for a placement on [the] *a* floorboard of [a] *the* vehicle beneath [a brake pedal] *the brake or clutch pedal and the brake or clutch pedal shaft*;

a [stainless steel] U-shaped housing extending downward and having a first arm attached to [the] *said* base and having a second shorter arm defining an opening for receiving [a] *the* brake *or clutch* pedal shaft, said [space] *opening* between [the] *said* first and second arms defining a slot for receiving the brake *or clutch* pedal shaft and permitting [the] full extension of the brake *or clutch* pedal shaft both upward and downward through said slot, said first arm having a cylindrical opening extending therethrough [and collinearly with said slot], said base and said second shorter [arms] *arm* further having matable beveled surfaces to facilitate [the ease of] *easier* positioning of said brake *or clutch* pedal in said opening;

a serrated rod extending through said cylindrical opening and being slidable [therewith] *therein*, said rod having a pin at a first end for catching [the] *an* underside of said brake *or clutch* pedal shaft within [the] *said* slot and a handle at a second end for pulling [said] *the* brake *or clutch* pedal shaft upward in a decompressed position; and a key activated locking mechanism adapted to lock [the] *said* serrated rod [for] and pin [in position] *with respect to said housing* such that the [that the] brake *or clutch* pedal cannot be depressed.

*14. A device for locking a brake or clutch pedal of a vehicle, the brake or clutch pedal being supported by a pedal shaft, the device comprising*

*a base, including a first elongated member and a second elongated member, the second elongated member being secured to and extending outwardly from a lateral side of the first elongated member at a predetermined angle, the base being adapted for placement on a floor of the vehicle beneath the brake or clutch pedal and the pedal shaft;*

*a housing extending from one of the first and second elongated members;*

*a rod slidably disposed on said housing, said rod having a first end which engages the underside of said brake or clutch pedal shaft and a second end for pulling the rod and the pedal shaft upward in a decompressed position; and*

*a locking mechanism positioned on the housing which locks the rod with respect to the housing to retain the pedal shaft in the decompressed position such that the pedal cannot be operably depressed.*

*15. The device as recited in claim 14 wherein the predetermined angle is ninety (90°) degrees.*

*16. The device as recited in claim 14 wherein the second member is secured to the lateral side of the first member, approximately midway along the length of the first member.*

*17. The device as recited in claim 14 wherein the second leg is secured to the first elongated member at a location such that the slot is aligned with the second elongated member.*

*18. The device as recited in claim 14 wherein the first elongated member includes an upper surface to which the second leg is secured and an opposite lower surface, the lower surface including at least one outwardly extending member to facilitate retention of the base on the vehicle floor.*

*19. The device as recited in claim 18 wherein the outwardly extending member comprises a cleat.*

*20. The device as recited in claim 18 wherein the outwardly extending member comprises a stud.*

*21. The device as recited in claim 18 wherein the first elongated member includes a first cleat on the lower surface proximate to a first end thereof and second cleat on the lower surface proximate to a second end thereof.*

*22. The device as recited in claim 21 wherein the second elongated member includes an upper surface and a lower surface, the lower surface of the second elongated member including a stud thereon.*

*23. The device as recited in claim 22 wherein the stud is located on the lower surface of the second elongated member proximate to a distal end thereof.*

*24. A device for locking a brake or clutch pedal of a vehicle, the brake or clutch pedal being supported by a pedal shaft, the device comprising:*

*a base for placement on the floor of a vehicle beneath the brake or clutch pedal and the pedal shaft, the base having a lower surface for engaging the vehicle floor, the lower surface including at least one outwardly extending member to facilitate retention of the base on the vehicle floor;*

*a housing extending from the base;*

*a rod slidably disposed on said housing, said rod having a first end which engages the underside of said brake or clutch pedal shaft and a second end for pulling the rod and the pedal shaft upward in a decompressed position; and*

*a locking mechanism positioned on the housing which locks the rod with respect to the housing to retain the pedal shaft in the decompressed position such that the pedal cannot be operably depressed.*

*25. The device as recited in claim 24 wherein the outwardly extending member comprises a cleat.*

*26. The device as recited in claim 24 wherein the outwardly extending member comprises a stud.*

*27. The device as recited in claim 24 wherein the base includes first and second ends and first and second lateral*

*sides, the lower surface of the base including a first cleat proximate to the first lateral side near the first end, a second cleat proximate to the first lateral side near a second end and a stud proximate to the second lateral side.*

*28. The device as recited in claim 27 wherein the stud is located midway between the first and second ends of the base.*

*29. A device for locking a brake or clutch pedal of a vehicle the brake or clutch pedal being, supported by a pedal shaft, the device comprising:*

*a base for placement on a floor of the vehicle beneath the brake or clutch pedal and the pedal shaft;*

*a housing extending from the base and including a member for enabling a user to press the device toward the vehicle floor to facilitate installation of the device; and*

*a rod slidably disposed on said housing, said rod having a first end which engages the underside of said brake or clutch pedal shaft and a second end for pulling the rod and the pedal shaft upward in a decompressed position, and*

*a locking mechanism positioned on the housing which locks the rod with respect to the housing to retain the pedal shaft in the decompressed position such that the brake or clutch pedal cannot be operably depressed.*

*30. The device as recited in claim 29 wherein the member for enabling a user to press the device toward the vehicle floor comprises a portion of a cross member which extends generally perpendicularly from the housing.*

*31. The device as recited in claim 29 wherein the member for enabling a user to press the device toward the vehicle floor is of a size suitable for receiving the foot of a user to facilitate pressing the device toward the vehicle floor for engagement of the locking mechanism.*

*32. A device for locking a brake or clutch pedal of a vehicle the brake or clutch pedal being supported by a pedal shaft, the device comprising:*

*a base for placement on a floor of the vehicle beneath the brake or clutch pedal and the pedal shaft;*

*a housing extending from the base;*

*a rod slidably disposed on said housing, said rod having a first end which engages the underside of said pedal shaft and a second end for pulling the rod and the pedal shaft upward in a decompressed position, and*

*a locking mechanism positioned on the housing which locks the rod with respect to the housing to retain the pedal shaft in the decompressed position such that the pedal cannot be operably depressed.*

*33. A device for locking a brake or clutch pedal of a vehicle, the pedal being supported by a pedal shaft, the device comprising:*

*a base for placement on a floor of the vehicle beneath the brake or clutch pedal and the pedal shaft;*

*a housing extending from the base; and*

*a locking mechanism comprising a rod having a locking pin on one end, the rod being slidably disposed in an opening in the housing between a first position wherein the brake or clutch pedal may be depressed and a second, locked position wherein the locking pin is in engagement with a lower side of the pedal shaft for locking the pedal shaft with respect to the housing such that the brake or clutch pedal cannot be operably depressed, the rod having a handle on the other end, the handle having a dimension which is greater than a dimension of the opening in the housing to limit movement of the rod with respect to the housing when the rod is moved to the first position.*

*34. A device for locking a brake or clutch pedal of a vehicle, the brake or clutch pedal being supported by a pedal shaft, the device comprising:*

*a base for placement on a floor of the vehicle beneath the brake or clutch pedal and the pedal shaft;*

*a housing extending from the base;*

*a rod slidably disposed on said housing and including a serrated portion, said rod having a first end which engages the underside of said pedal shaft and a second end for pulling the rod and the pedal shaft upward in a decompressed position; and*

*a locking mechanism positioned on the housing which locks the rod with respect to the housing to retain the pedal shaft in the decompressed position such that the pedal cannot be operably depressed, the locking mechanism including a lock located on the housing and being in engagement with the serrated portion of the rod for locking the rod in at least the second position.*

*35. A device for locking a brake or clutch pedal of a vehicle, the brake or clutch pedal being supported by a pedal shaft, the device comprising:*

*a base for placement on a floor of the vehicle beneath the brake or clutch pedal and the pedal shaft;*

*a housing extending from the base; and*

*a rod slidably disposed on said housing, said rod having a first end which engages the underside of said control pedal shaft and a second end for pulling the rod and the pedal shaft upward in a decompressed position; and*

*a locking mechanism positioned on the housing which locks the rod with respect to the housing to retain the pedal shaft in the decompressed position such that the brake or clutch pedal cannot be operably depressed, one of said housing and rod defining two generally parallel members positioned on opposite sides of the pedal shaft when the first end of the rod engages the underside of the pedal shaft.*

* * * * *